(12) United States Patent
Wang et al.

(10) Patent No.: US 10,582,201 B2
(45) Date of Patent: Mar. 3, 2020

(54) MOST-INTERESTED REGION IN AN IMAGE

(71) Applicant: QUALCOMM Incorporated, San Diego, CA (US)

(72) Inventors: Ye-Kui Wang, San Diego, CA (US); Fnu Hendry, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 355 days.

(21) Appl. No.: 15/589,782

(22) Filed: May 8, 2017

(65) Prior Publication Data
US 2017/0339415 A1 Nov. 23, 2017

Related U.S. Application Data

(60) Provisional application No. 62/339,009, filed on May 19, 2016.

(51) Int. Cl.
*H04N 19/167* (2014.01)
*H04N 19/70* (2014.01)
(Continued)

(52) U.S. Cl.
CPC ......... *H04N 19/167* (2014.11); *H04L 65/601* (2013.01); *H04L 65/607* (2013.01); *H04L 65/80* (2013.01); *H04N 19/132* (2014.11); *H04N 19/162* (2014.11); *H04N 19/176* (2014.11); *H04N 19/70* (2014.11); *H04N 21/234345* (2013.01); *H04N 21/4728* (2013.01);
(Continued)

(58) Field of Classification Search
None
See application file for complete search history.

(56) References Cited

U.S. PATENT DOCUMENTS

2012/0106634 A1\* 5/2012 Jeon ................. H04N 19/597
                                                       375/240.12
2014/0086336 A1\* 3/2014 Wang ................. H04N 19/70
                                                       375/240.26
(Continued)

FOREIGN PATENT DOCUMENTS

WO        2015197815 A1     12/2015

OTHER PUBLICATIONS

International Preliminary Report on Patentability from corresponding PCT Application Serial No. PCT/US2017/031789 dated Jul. 10, 2018 (31 pp).

(Continued)

*Primary Examiner* — Davoud A Zand
(74) *Attorney, Agent, or Firm* — Shumaker & Sieffert, P.A.

(57) ABSTRACT

A device for determining information for video data includes one or more processors implemented in circuitry that are configured to determine one or more most-interested regions of a plurality of regions of an image of video data based on data representative of the one or more most-interested regions. The data representative of the one or more most-interested regions is external to video coding layer (VCL) data of a bitstream including the video data. The processors output a request for relatively high-quality video data for the one or more most-interested regions of the image and output, after outputting the request for the relatively high-quality video data, a request for relatively low-quality video data for one or more other regions of the image.

42 Claims, 7 Drawing Sheets

(51) Int. Cl.
*H04N 19/132* (2014.01)
*H04N 19/176* (2014.01)
*H04N 21/84* (2011.01)
*H04N 21/845* (2011.01)
*H04N 21/81* (2011.01)
*H04N 21/4728* (2011.01)
*H04N 19/162* (2014.01)
*H04N 21/2343* (2011.01)
*H04L 29/06* (2006.01)

(52) U.S. Cl.
CPC ......... *H04N 21/8146* (2013.01); *H04N 21/84* (2013.01); *H04N 21/8456* (2013.01)

(56) References Cited

U.S. PATENT DOCUMENTS

| | | | |
|---|---|---|---|
| 2014/0092963 | A1 | 4/2014 | Wang et al. |
| 2014/0192149 | A1* | 7/2014 | Wang ............... H04N 19/70 348/43 |
| 2014/0355692 | A1* | 12/2014 | Ramasubramonian ............... H04N 19/597 375/240.26 |
| 2015/0271529 | A1* | 9/2015 | Wang ............... H04N 19/89 375/240.26 |
| 2016/0100196 | A1* | 4/2016 | Wu ............... H04N 19/70 375/240.02 |
| 2017/0302920 | A1* | 10/2017 | Pettersson ............ H04N 19/147 |

OTHER PUBLICATIONS

International Search Report and Written Opinion—PCT/US2017/031789—ISA/EPO—dated Jul. 21, 2017 (12 pages).

Kuzyakov E., "Next-generation video encoding techniques for 360 video and VR," Jan. 21, 2016 (Jan. 21, 2016), XP055387524, pp. 3 pages. Retrieved from the Internet: URL:https://tcode.facebook.com/posts/112635 4007399553/next-generation-video-encodingtechniques-for-360-video-and-vr/ [retrieved on Jul. 4, 2017] the whole document.

Lee J.,et al., "Additional Requirements for Omnidirectional Media Format," Motion Picture Expert Group or ISO/IEC JTC1/SC29/WG11, 114. MPEG Meeting San Diego; M37819, Feb. 17, 2016 (Feb. 17, 2016), XP030066185, pp. 2 pages.

Wang Y.,et al., "Signalling of most-interested regions of VR video," Motion Picture Expert Group or ISO/IEC JTC1/SC29/WG11,115. MPEG Meeting, Geneva; M-38560, May 25, 2016 (May 25, 2016), XP030066916, pp. 1-3.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Fielding, et al., "Hypertext Transfer Protocol—HTTP/1.1," Network Working Group; RFC 2616, Jun. 1999, 200 pp.

U.S. Appl. No. 15/195,439, filed by Ajit Deepak Gupte et al., filed Jun. 28, 2016.

U.S. Appl. No. 15/599,295, filed by Fnu Hendry et al., filed May 18, 2017.

Yip E., et al., "OMAF ROI-VE: ROI and Guard Region Signalling", 117. MPEG Meeting; Jan. 16, 2017-Jan. 20, 2017; Geneva; (Motion Picture Expert Group or ISO/IEC JTC1/SC29/WG11), No. m39840, Jan. 11, 2017 (Jan. 11, 2017), pp. 1-9, XP030068185.

Second Written Opinion from corresponding PCT Application Serial No. PCT/US2017/031789 dated March 26, 2018 (16 pp).

Response to Written Opinion from corresponding PCT Application Serial No. PCT/US2017/031789 filed on Sep. 25, 2017 (37 pages).

* cited by examiner

MOST-INTERESTED REGION IN AN IMAGE

This application claims the benefit of U.S. Provisional Application No. 62/339,009, filed May 19, 2016, which is hereby incorporated by reference in its entirety.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks or coding tree units (CTUs). In the remainder of this document, the two terms macroblocks and CTUs are used interchangeably. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as the AVC file format.

After the video data has been packetized for transmission or storage, a client device may request the packetized video data at a suitable quality. For example, the client device may request the packetized video data at a relatively high-quality when a bandwidth between the client device and a digital video device transmitting the packetized video is high and request the packetized video data at a relatively low-quality when a bandwidth between the client device and a digital video device transmitting the packetized video is low.

SUMMARY

In general, this disclosure describes techniques for generating a bitstream that includes data representative of one or more most-interested regions of an image of video data. The one or more most-interested regions of an image are more likely to be rendered to the user at the presentation time of the image compared to the other regions of the image. A device may use the one or more most-interested regions to pre-fetch video data for the one or more most-interested regions. For example, the device may fetch video data for the one or more most-interested regions at a lower latency and/or at a higher quality than video data for the other regions of the image, where the device may refer to be an entity that contains the video decoder, a network element such as a content delivery network (CDN) node, or another entity.

In one example, a method of determining information for video data includes determining, by a processor of a client device, the processor implemented in circuitry, one or more most-interested regions of a plurality of regions of an image of video data based on data representative of the one or more most-interested regions. The data representative of the one or more most-interested regions is external to video coding layer (VCL) data of a bitstream including the video data. The method further includes outputting, by the processor of the client device, a request for relatively high-quality video data for the one or more most-interested regions of the image and outputting, by the processor of the client device, after outputting the request for the relatively high-quality video data, a request for relatively low-quality video data for one or more other regions of the image.

In another example, a device for determining information for video data includes one or more processors implemented in circuitry that are configured to determine one or more most-interested regions of a plurality of regions of an image of video data based on data representative of the one or more most-interested regions. The data representative of the one or more most-interested regions is external to VCL data of a bitstream including the video data. The one or more processors are further configured to output a request for relatively high-quality video data for the one or more most-interested regions of the image and output, after outputting the request for the relatively high-quality video data, a request for relatively low-quality video data for one or more other regions of the image.

In another example, a device for determining information for video data includes means for determining one or more most-interested regions of a plurality of regions of an image of video data based on data representative of the one or more most-interested regions. The data representative of the one or more most-interested regions is external to VCL data of a bitstream including the video data. The device further includes means for outputting a request for relatively high-quality video data for the one or more most-interested regions of the image and means for outputting after outputting the request for the relatively high-quality video data, a request for relatively low-quality video data for one or more other regions of the image.

In another example, a computer program product includes a computer-readable storage medium comprises instructions that, when executed, cause a processor of a source device for determining information for video data to determine one or more most-interested regions of a plurality of regions of an image of video data based on data representative of the one or more most-interested regions. The data representative of the one or more most-interested regions is external to VCL data of a bitstream including the video data. The instructions further cause the processor to output a request for relatively high-quality video data for the one or more most-interested regions of the image and output, after outputting the request for the relatively high-quality video data, a request for relatively low-quality video data for one or more other regions of the image.

In another example, a method of signaling information for video data includes determining, by a processor of a source device, the processor implemented in circuitry, one or more most-interested regions of a plurality of regions of an image of video data. The one or more most-interested regions comprising one or more regions that are most likely to be retrieved by a client device. The method further includes generating, by the processor of the source device, data representative of the one or more most-interested regions. The data representative of the one or more most-interested regions is external to VCL data of a bitstream including the video data.

In another example, a device for signaling information for video data includes one or more processors implemented in circuitry that are configured to determine one or more most-interested regions of a plurality of regions of an image of video data. The one or more most-interested regions including regions most likely to be retrieved by a client device. The one or more processors being further configured to generate data representative of the one or more most-interested regions. The data representative of the one or more most-interested regions is external to VCL data of a bitstream including the video data.

In another example, a device for signaling information for video data includes means for determining one or more most-interested regions of a plurality of regions of an image of video data. The one or more most-interested regions comprising one or more regions that are most likely to be retrieved by a client device. The device further includes means for generating data representative of the one or more most-interested regions. The data representative of the one or more most-interested regions is external to VCL data of a bitstream including the video data.

In another example, a computer program product includes a computer-readable storage medium comprises instructions that cause a processor to determine one or more most-interested regions of a plurality of regions of an image of video data. The one or more most-interested regions comprising one or more regions that are most likely to be retrieved by a client device. The instructions further cause the processor to generate data representative of the one or more most-interested regions. The data representative of the one or more most-interested regions is external to VCL data of a bitstream including the video data.

The details of one or more examples are set forth in the accompanying drawings and the description below. Other features, objects, and advantages will be apparent from the description and drawings, and from the claims.

DETAILED DESCRIPTION

Figure 1:
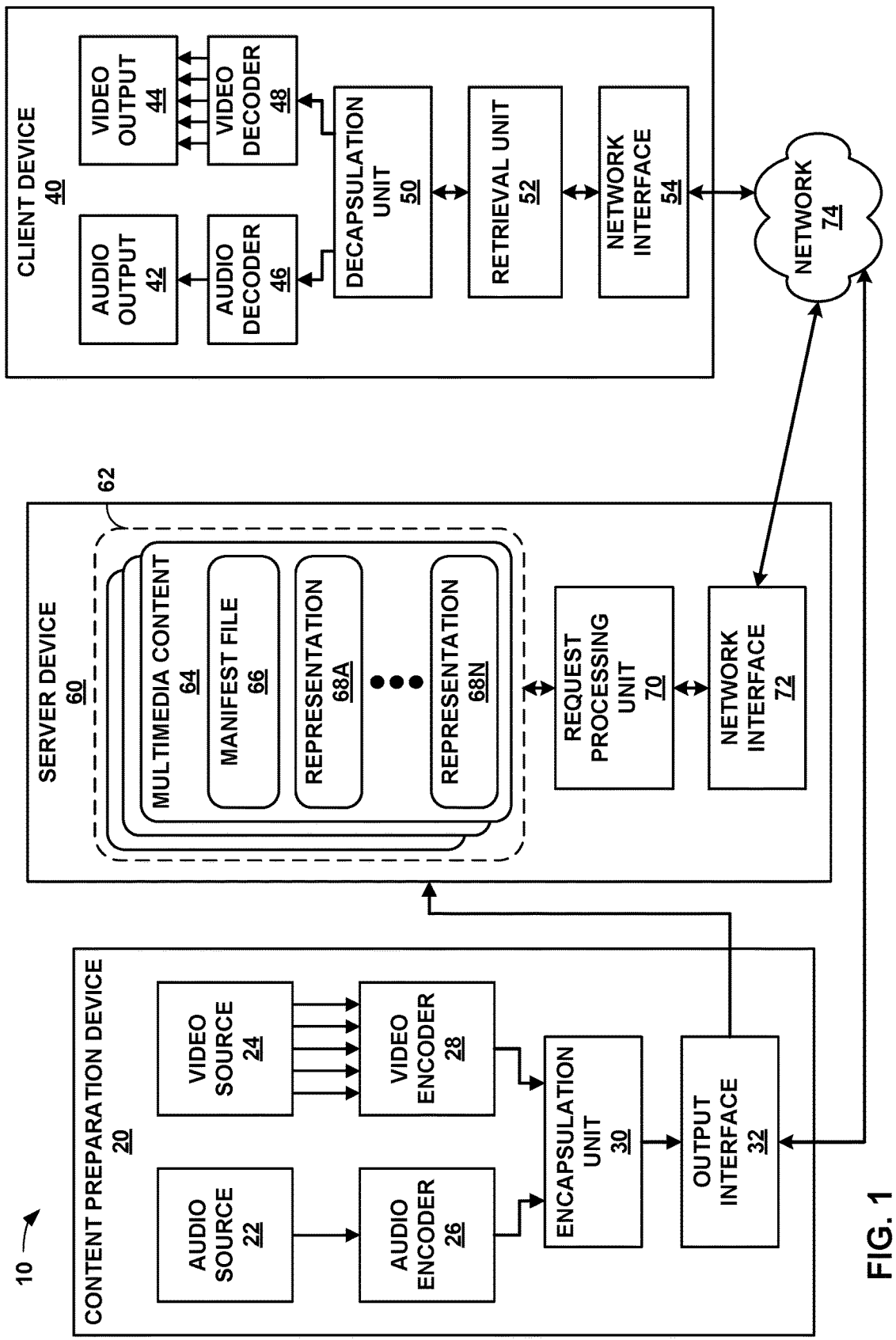
FIG. 1 is a block diagram illustrating an example system that implements techniques for streaming media data over a network.

This invention relates to virtual reality (VR). More specifically, this invention discloses some methods for creation of a set of one or more most-interested regions in VR video, signaling of information of most-interested regions, and use of the information in encoding, streaming, playback, and management of VR video content.

In general, this disclosure describes techniques for generating video content that includes data representative of one or more most-interested regions of an image of video data. A director or producer may select the one or more most-interested regions or a computing device may derive the one or more most-interested regions from user statistics by a service or content provider, e.g., through the statistics of which regions have been requested/seen the most by users when the omnidirectional video content was provided through a streaming service. In any case, a client device may use the one or more most-interested regions to pre-fetch video data for the one or more most-interested regions to improve a playback of a video, such as, a virtual reality video, which is also referred to as 360 video.

Specifically, a client device may determine, for example, using information received in a header or message for transmitting video coding layer data of a bitstream, data representative of the one or more most-interested regions. Upon determining the one or more most-interested regions from the data representative of the one or more most-interested regions, the client device may request the one or more most-interested regions in a relatively high-quality. After requesting the one or more most-interested regions in the relatively high-quality, the client device may request one or more other regions of the image in a relatively lower quality than the high-quality based on a field of view (FOV) of the user. In this manner, the one or more most-interested regions may be pre-fetched (e.g., fetched prior to receiving the FOV of the user) to permit the one or more most-interested regions to be received at the high-quality, thereby improving a playback of a video, such as, a virtual reality video. That is, a device may use the one or more most-interested regions to pre-fetch video data for the one or more most-interested regions. For example, the device may fetch the video data for the one or more most-interested regions at a lower latency and/or at a higher quality than video data for the other regions of the image, where the device may refer to be an entity that contains the video decoder, a network element such as a content delivery network (CDN) node, or another entity.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units (e.g., VCL data) and non-VCL NAL units. VCL units (also referred to as VCL data) may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

Request processing unit 70 may be configured to assemble data from requests. For example, request processing unit 70 may extract, from each request from client devices, an indication of one or more regions of an image that have been requested. For instance, request processing unit 70 may extract a user's field of view for a particular image from a request from client device 40. After extracting, request processing unit 70 may generate an entry in a table or database indicating, for each image, one or more regions of a user's field of view that were requested by a client device. (e.g., client device 40).

Request processing unit 70 may derive one or more most-interested regions from the assembled data. More specifically, for instance, in response to determining that one or more regions of an image are the most-frequently requested regions of the image compared to other regions of the image, request processing unit 70 may select the one or more regions as the one or more most-interested regions of the image. In some examples, request processing unit 70 may select one or more regions as the one or more most-interested regions of the image when the one or more regions have been included in user's field of view at a frequency that satisfies a threshold. For instance, request processing unit 70 may select the one or more regions as the one or more most-interested regions of the image when the assembled data indicates that at least half of the user's field of views include the one or more regions.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC), multiview extension (i.e., multiview high efficiency video coding, MV-HEVC), and 3D extension (i.e., 3D high efficiency video coding, 3D-HEVC). One joint draft of MVC is described in "Advanced video coding for generic audiovisual services," ITU-T Recommendation H.264, March, 2010.

Encapsulation unit 30 may determine one or more most-interested regions of an image. As used herein, a most-interested region may refer to a region of an image that has a high likelihood of being viewed by a user. For example, a most-interested region may refer to a region of an image that is selected by a director or producer. In some examples, a most-interested region may refer to a region of an image that is derived by a computing device from user statistics by a service or content provider, e.g., through the statistics of which regions have been requested/seen the most by users when the omnidirectional video content was provided through a streaming service.

Encapsulation unit 30 may encapsulate data representative of one or more most-interested regions. In some examples, encapsulation unit 30 may encapsulate the data representative of one or more most-interested regions external to VCL data, which may include actual video data used by the video coding engine. In some examples, the data representative of one or more most interested regions may be included in a bitstream. For instance, encapsulation unit 30 may encapsulate a SEI message that includes the data representative of one or more most-interested regions external to the VCL data. In some examples, encapsulation unit 30 may encapsulate a file format data that includes the data representative of one or more most-interested regions external to the video bitstream (and consequently also external to the VCL data of the bitstream). For instance, encapsulation unit 30 may encapsulate a box (e.g., sample-to-group) or a timed metadata track that includes the data representative of one or more most-interested regions external to the VCL data.

With respect to VR video applications, when considering ways to utilize information on most-interested regions, we identify at least some of the following problems:
1. Using the information on most-interested regions for displaying the most-interested regions without user control may lower VR video experience if the user is actually interested other regions in the VR video. Instead, the information on most-interested regions may be used in other ways for improved VR video experience.
2. The most-interested regions in a particular set of pictures of a VR video may be determined or created by other ways than director's cut.
3. There lacks a concrete way of signaling information on most-interested regions.

This disclosure describes several techniques for signaling and reconstructing of one or more most-interested region in VR video encoding, decoding, streaming, and playback. One or more of these techniques may be applied independently, or in combination with others.

In a first example, the most-interested regions may be determined by the intent of the director or producer, or by user statistics by a service or content provider, e.g., through which regions have been requested/seen the most by users when the VR video content was provided through a streaming service.

In a second example, during video encoding or transcoding, the most-interested regions may be intentionally encoded with higher quality (e.g., by using lower quantization parameters), higher resolution (if different regions of the video pictures are sub-sampled with different sub-sampling ratios during video stitching or video encoding), or higher frequency of random accessibility than other regions.

In a third example, this disclosure proposes the signalling of the information on most-interested regions using SEI messages in a video bitstream, file format metadata in a media file, or dynamic adaptive streaming over HTTP (DASH) media presentation description (MPD) elements or attribute.

The information on most-interested regions for a particular set of pictures of a VR video bitstream may be signalled using an SEI message. An instance of this SEI message is specified to be applicable to the set of (one or more) pictures by syntax, semantics or both. The SEI message may contain at least the following syntax elements:
  i. A syntax element indicating the number of most-interested regions.
  ii. A loop of a set of syntax elements, each set describing the position and size of a most-interested region. For example, each set may include four syntax element indicating the up, bottom, left and right offsets, in number of luma samples in relative to the full picture, of the four corners of a rectangle that is a most-interested region. In another example, each set may include two syntax element indicating the coordinate, in number of luma samples in relative to the full picture, of the upper-left corner of a rectangle that is a most-interested region, and two syntax elements indicating the width and height of the rectangle.
  iii. For each of the most-interested region, a priority may be indicated by a syntax element, with a high priority indicating a higher interest of the region.
  iv. A syntax element indicating whether to cancel the effect of all earlier instances of this SEI message in decoding order.
  v. A syntax element indicating whether the information in the current instances of this SEI message persists until the next picture in output order, or the start of a new coded video sequence, or the end of the bitstream.

The SEI message can be included as part of H.264/AVC, H.265/HEVC, or any other video codec specification. The NAL unit containing the SEI message can be directly included in 1) a file format box or structure for signalling of the information in file format, 2) an SDP field for signalling of the information in SDP, 3) a DASH MPD attribute or element for signalling of the information in DASH MPD, and 4) an MPEG-2 transport stream (TS) descriptor for signalling of the information in MPEG-2 TS.

The same information as described above may be directly carried in a file format data structure, e.g., by using a new sample group, or by inclusion in a timed metadata track.

The same information as described above may be directly carried using some new elements, attributes, and/or descriptor in a DASH MPD.

In a fourth example, during client-controlled video streaming such as DASH, when a content delivery network (CDN) is in use, an edge server (e.g., server device 60) or a cache may use the information on most-interested regions to obtain the video data of a higher-quality representation and covering the most-interested regions of the upcoming image slightly before receiving a request from client device 40, predicting that the video data would most likely be requested soon. The upcoming image may be the image that is immediately subsequent to the image that one or more regions of which have been recently sent to client device 40 and that are being presented or are soon to be presented by client device 40.

In a fifth example, during client-controlled video streaming such as DASH, client device 40 may use the information on most-interested regions to request the video data of a higher-quality representation and covering the most-interested regions of the upcoming image slightly before a user turns his/her head and sends the requests, predicting that the video data would most likely be requested soon. Again, the upcoming image may be an image that is immediately subsequent to the image that one or more regions of which have been recently sent to client device 40 and that are being presented or are soon to be presented by client device 40.

In a sixth example, a server-controlled video streaming system (e.g., server device 60) such as 3GPP packet-switched streaming (PSS) in 3GPP TS 26.234, may be configured with features that enable streaming clients (e.g., client device 40) to send feedback on a direction of a current FOV for the server to choose appropriate video data covering the most-interested regions to be sent. In such a configured server-controlled video streaming system, server device 60 may use the information on most-interested regions to send the video data of a higher-quality representation and covering the most-interested regions of an upcoming image slightly before receiving a streaming client's feedback on the direction of the current FOV, predicting that the video data would most likely need to be sent soon. For example, in response to determining that a particular streaming client is outputting a particular image, server device 60 may output, to the particular streaming client, video data of a higher-quality representation and covering the most-interested regions of an upcoming image that is immediately subsequent to the particular image.

In a seventh example, for storage management of content (e.g., VR content) that involves cache (e.g., at server device 60), server device 60 may determine which regions of a particular image to store in cache using data representative of one or more most-interested regions in the particular image. A developer may design a storage selection algorithm and server device 60 may execute the algorithm to give regions of an image a rank based on a selected degree of interest in the regions (e.g., based on a director's opinion) and/or based on a derived degree of interest in the region (e.g., based on user statistic of watching behavior after the content has been available for some time). Server device 60 may store, in the cache, video data for the regions of the particular image with a rank value that satisfies a threshold (e.g., is greater than the threshold). For example, when only the rank values for the most-interested regions of the particular image satisfy the threshold, server device 60 may store only video data for the most-interested regions of the particular image in the cache. In this example, client device 40 may retrieve video data for the most-interested regions of the particular image from the cache and may retrieve video data for other regions of the particular image from a main server storage, which may be positioned further from users than the cache. Additionally, or alternatively, server device 60 may dynamically determine the threshold based on the amount of available space in the cache.

In an eight example, for long-term storage of VR content, server device 60 may use data representative of one or more most-interested regions in a particular image (e.g., of a VR video) to decide which regions of the image to store. A developer may design a storage selection algorithm and server device 60 may execute the algorithm to give regions a rank based on a selected degree of interest in the regions (e.g., based on a director's opinion) and/or based on a derived degree of interest in the region (e.g., based on user statistic of watching behavior after the content has been available for some time). Server device 60 may store, in long-term storage (e.g., configured to store video data for weeks, months, years, etc.), video data for the regions of the particular image with a rank value that satisfies a threshold (e.g., is greater than the threshold). For example, when only the rank values for the most-interested regions of the particular image satisfy the threshold, server device 60 may store only video data for the most-interested regions of the particular image in the long-term storage and remove video data for other regions of the particular image from the long-term storage.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment. In some examples, manifest file 66 may include data representative of one or more most-interested regions in a particular image, per techniques of this disclosure.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In this manner, content preparation device 20 represents an example of a device for signaling information for video data, the device including a processor configured to determine one or more most-interested regions of a plurality of regions of an image of video data. The most-interested regions comprising one or more regions that are most likely to be retrieved by a client device. The processor may further be configured to generate data representative of the most-interested regions. The data representative of the most-interested regions is external to VCL data of a bitstream including the video data.

Additionally, client device 40 represents an example of a device for determining information for video data, the device including a processor configured to determine one or more most-interested regions of a plurality of regions of an image of video data based on data representative of the most-interested regions. The data representative of the most-interested regions being external to VCL data of a bitstream including the video data. The processor may further be configured to output a request for high-quality video data for the one or more most-interested regions of the image and output, after outputting the request for high-quality video data for the one or more most-interested regions of the image, a request for low-quality video data for one or more other regions of the image.

Figure 2:
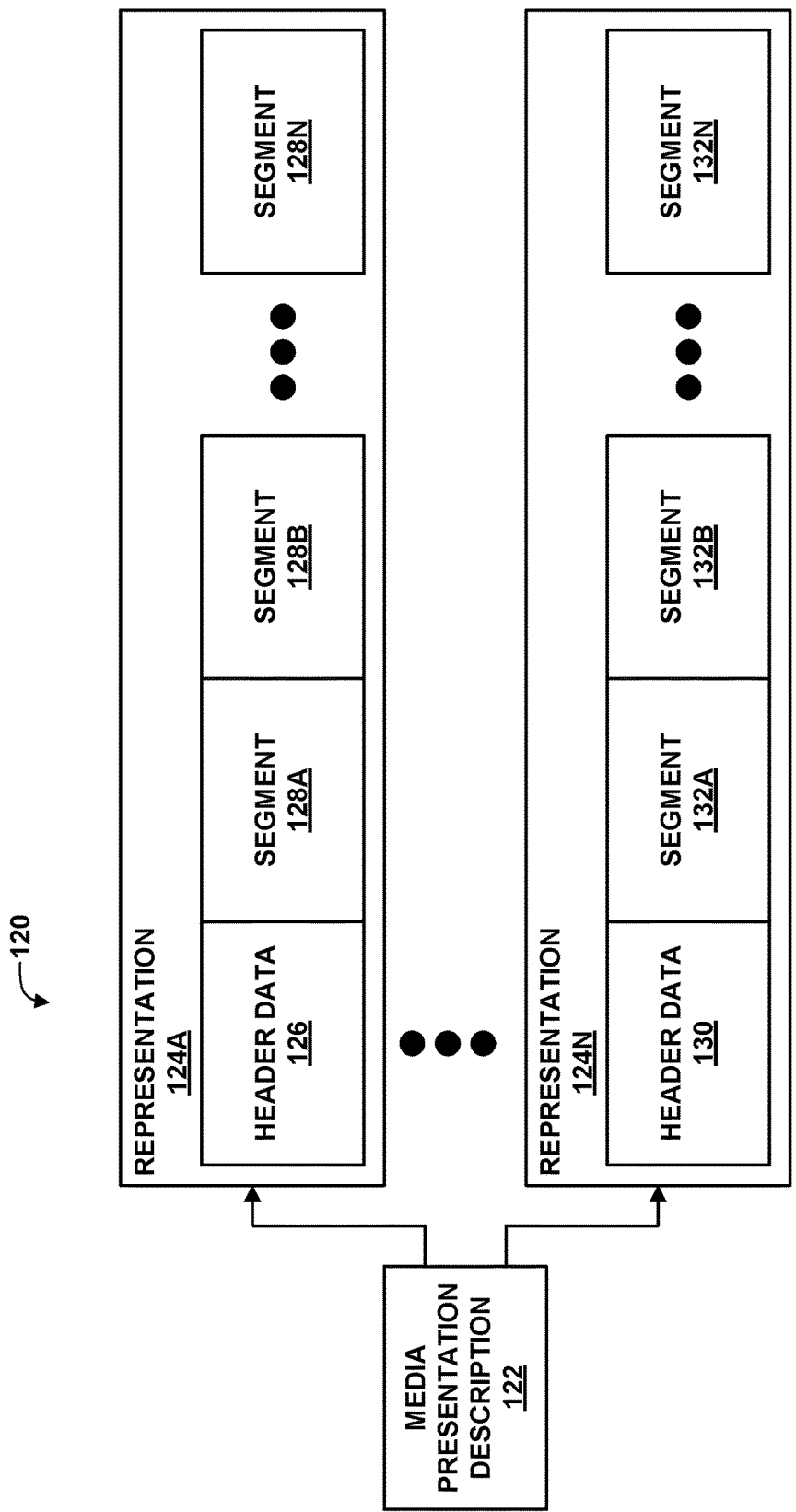
FIG. 2 is a conceptual diagram illustrating elements of example multimedia content.

FIG. 2 is a conceptual diagram illustrating elements of example multimedia content 120. Multimedia content 120 may correspond to multimedia content 64 (FIG. 1), or another multimedia content stored in storage medium 62. In the example of FIG. 2, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

Although FIG. 2 describes an example where system 10 (FIG. 1) is configured for DASH, in some examples, system 10 may be configured for other media playback control protocols, for example, but not limited to, real-time streaming protocol (RTSP), real-time transport protocol (RTP), RTP control protocol (RTCP), session description protocol (SDP), another media playback control protocol, or a combination thereof.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 2. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH, although other streaming network protocols may be used. In this manner, a destination device, such as client device 40, may use an HTTP GET request to retrieve segments 128 or 132. In some examples, client device 40 may use HTTP partial GET requests to retrieve specific byte ranges of segments 128 or 132. For example, client device 40 may use a first HTTP partial GET request to initially retrieve data representative of most-interested regions from one of segments 128, 132, determine the most-interested regions, then use a second HTTP partial GET request to pre-fetch high-quality versions of video data for the most-interested regions from one of segments 128, 132, assuming the most-interested regions data is included within segments 128, 132, e.g., in file format information.

Additionally or alternatively, in accordance with the techniques of this disclosure, MPD 122 may include elements or attributes indicating the one or more most-interested regions. For example, MPD 122 may include, for each of segments 128, 132, elements or attributes representative of a respective position of a most-interested region and a respective size of the most-interested region.

More specifically, for example, MPD 122 may include, for each of segments 128, 132 (or one or more pictures within segments 128, 132), elements or attributes that loop over a most-interested region, each iteration of the loop representing one of the most-interested regions and including the syntax elements representative of the position of the most-interested region and the size of the most-interested region. In some examples, MPD 122 may include, for each of segments 128, 132, elements or attributes that include, for each of the most-interested regions, a first syntax element representative of a top of the most-interested region, a second syntax element representative of a bottom of the most-interested region, a left side of the most-interested region, and a right-side of the most interested region. In some examples, MPD 122 may include, for each of segments 128, 132, elements or attributes that include, for each of the most-interested regions, a first syntax element representative of an upper-left corner of the most-interested region and a second syntax element representative of a lower-right corner of the most-interested region. In some examples, MPD 122 may include, for each of segments 128, 132, elements or attributes that include, for each of the most-interested regions, a first syntax element representative of an upper-left corner of the most-interested region, a second syntax element representative of a width of the most-interested region, and a third syntax element representative of a height of the most-interested region. In some examples, the MPD 122 may represent a respective position of a most-interested region and a respective size of the most-interested region in luma samples.

Figure 3:
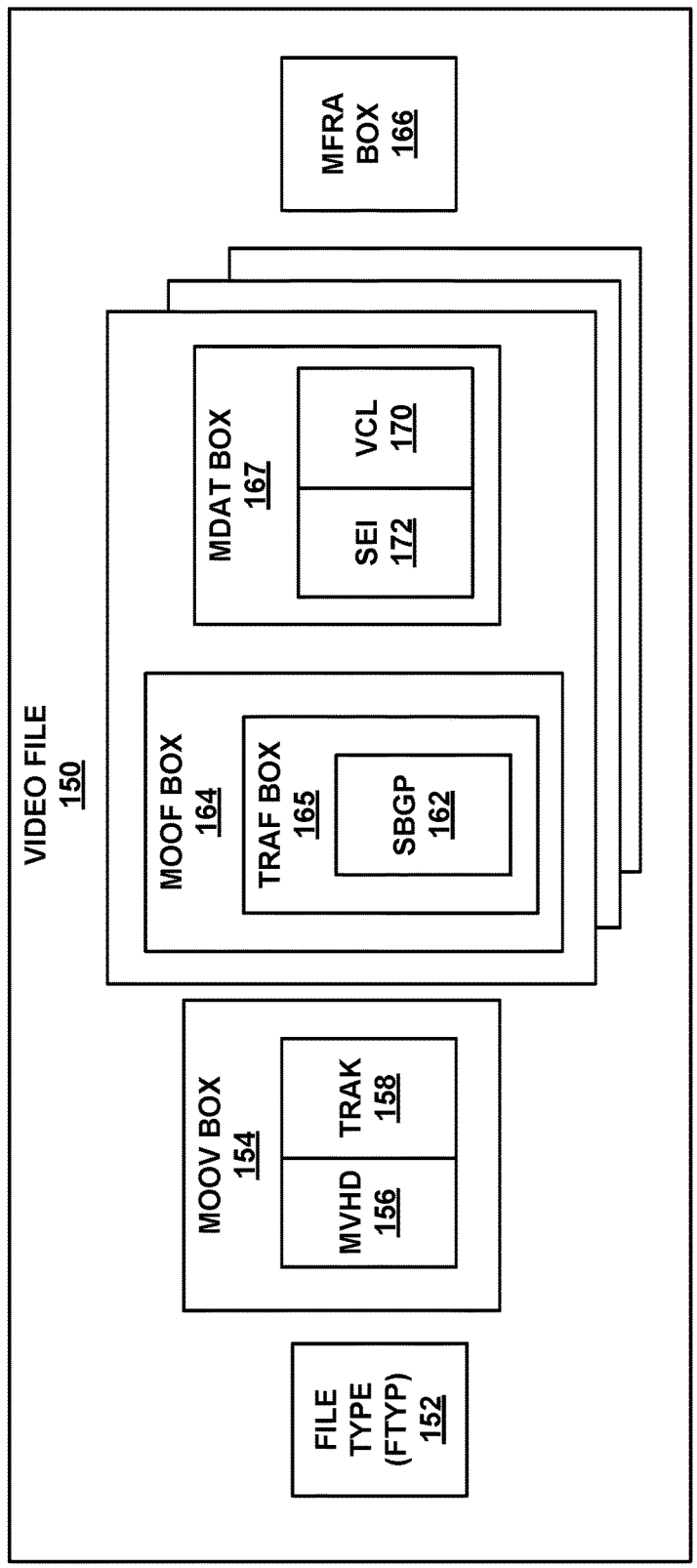
FIG. 3 is a block diagram illustrating elements of an example video file, which may correspond to a representation of FIG. 2.

FIG. 3 is a block diagram illustrating elements of an example video file 150, which may correspond to a segment of a representation, such as one of segments 128, 132 of FIG. 2. Each of segments 128, 132 may include data that conforms substantially to the arrangement of data illustrated in the example of FIG. 3. Video file 150 may be said to encapsulate a segment. As described above, video files in accordance with the ISO base media file format and extensions thereof store data in a series of objects, referred to as "boxes." In the example of FIG. 3, video file 150 includes file type (FTYP) box 152, movie (MOOV) box 154, one or more pairs of movie fragment (MOOF) box 164 and media data (MDAT) box 167, and movie fragment random access (MFRA) box 166. Although FIG. 3 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, MOOF box 164, and/or MFRA box 166.

MOOV box 154, in the example of FIG. 3, includes movie header (MVHD) box 156 and track (TRAK) box 158. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in MDAT box 167, which may be referenced by data of TRAK box 158.

Video file 150 may include a timed metadata track. For example, video file 150 may be for a representation that includes one or more timed metadata tracks. For instance, video file 150 may be for representation 124N that includes one or more timed metadata tracks and does not include associated media track(s). In some examples, video file 150 may be for a representation that includes one or more timed metadata tracks multiplexed together with an associated media track. For instance, video file 150 may be for representation 124A that includes one or more timed metadata tracks multiplexed together with an associated media track (s). In any case, a timed metadata track may contain descriptive or annotative metadata for a track of video file 150.

Video file 150 may include a respective pair of MOOF box 164 and MDAT box 167 for each respective track included in video file 150. As shown, each MOOF box 164 may include a track fragment (TRAF) box 165. TRAF box 165, in the example of FIG. 3, includes sample-to-group (SBGP) 162. SBGP box 162 may describe a group that a sample or track belongs to and the associated description of that sample group. TRAF box 165 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within TRAK box 158 describing the parameter set track.

MDAT box 167 may include SEI message 172 and VCL NAL unit 170 for a respective track. VCL NAL unit 170 may include one or more coded video pictures. In some examples, VCL NAL unit 170 may include one or more groups of pictures (GOPs), each of which may include a number of coded video pictures, e.g., frames or pictures.

As noted above, encapsulation unit 30 may store a sequence data set in a video sample that does not include actual coded video data. A video sample may generally correspond to an access unit, which is a representation of a coded picture at a specific time instance. In the context of AVC, the access unit includes at least one VCL NAL unit 170 which contains the information to construct all the pixels of the access unit and other associated non-VCL NAL units, such as SEI message 172. Accordingly, encapsulation unit 30 may include a sequence data set, which may include SEI message 172 and VCL NAL unit 170. Encapsulation unit 30 may further signal the presence of a sequence data set and/or SEI message 172 as being present within MDAT box 167.

Video file 150 may include data representative of one or more most-interested regions in accordance with the techniques of this disclosure. More specifically, video file 150 may include the data representative of the one or more most-interested regions in file format header information of video file 150. For example, video file 150 may include an SEI message and/or file format information that signals the most-interested regions information. For instance, a timed meta data track may include data representative of the one or more most-interested regions. In some instances, SBGP box 162 may include data representative of the one or more most-interested regions. In some instances, SEI message 172 may include data representative of the one or more most-interested regions.

SEI message 172 can be included as part of H.264/AVC, H.265/HEVC, or other video codec specifications. In the example of FIG. 3, an SEI message includes data representative of most-interested regions for a corresponding picture of, e.g., VCL NAL unit 170. In other examples, such most-interested regions data may be included in 1) a file format box or structure for signalling of the information in file format, 2) an SDP field for signalling of the information in SDP, 3) a DASH MPD attribute or element for signalling of the information in DASH MPD (e.g., MPD 122 of FIG. 2), 4) an MPEG-2 transport stream (TS) descriptor for signalling of the information in MPEG-2 TS, in another box or structure, or a combination thereof MFRA box 166 may describe random access points within movie fragments of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments of video file 150 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Video file 150 may include a syntax element indicating a number of most-interested regions. For example, a timed metadata track may include the syntax element indicating the number of most-interested regions. In some examples, SBGP box 162 may include the syntax element indicating the number of most-interested regions. In some examples, SEI message 172 may include the syntax element indicating the number of most-interested regions.

Video file 150 may include a syntax element indicating whether the information in the current instances persists until a next image in output order, or the start of a new coded video sequence, or the end of the bitstream. For example, a timed metadata track may include the syntax element indicating whether the information in the current instances of the timed metadata track persists until the next image in output order, or the start of a new coded video sequence, or the end of the bitstream. In some examples, SBGP box 162 may include the syntax element indicating whether the information in the current instances of SBGP box 162 persists until the next image in output order, or the start of a new coded video sequence, or the end of the bitstream. In some examples, SEI message 172 may include the syntax element indicating whether the information in the current instances of SEI message 172 persists until the next image in output order, or the start of a new coded video sequence, or the end of the bitstream.

Video file 150 may include a syntax element indicating whether to cancel an effect of all earlier instances in decoding order. Said differently, in instances where data representative of the one or more most-interested regions indicates that the one or more most-interested regions persists to a next image in output order, or the start of a new coded video sequence, or the end of the bitstream, the syntax element indicating whether to cancel an effect may remove the persistence of the one or more most-interested regions. For example, a timed metadata track may include the syntax element indicating whether to cancel the effect of all earlier instances of the timed metadata track in decoding order. In some examples, SBGP box 162 may include the syntax element indicating whether to cancel the effect of all earlier instances of SBGP box 162 in decoding order. In some examples, SEI message 172 may include the syntax element indicating whether to cancel the effect of all earlier instances of SEI message 172 in decoding order.

Video file 150 may indicate, for each of the most-interested regions, a priority by a syntax element, with a high priority indicating a higher interest of the region. For example, a timed metadata track may indicate, for each of the most-interested region, a priority by a syntax element, with a high priority indicating a higher interest of the region. In some examples, SBGP box 162 may indicate, for each of the most-interested region, a priority by a syntax element, with a high priority indicating a higher interest of the region. In some examples, SEI message 172 may indicate, for each of the most-interested region, a priority by a syntax element, with a high priority indicating a higher interest of the region.

In accordance with the techniques of this disclosure, a data structure in file format information of video file 150 including the video data contained in VCL NAL unit 170 may include an indication of a respective position of a most-interested region and a respective size of the most-interested region.

For example, a timed metadata track may include data representative of the most-interested regions. For example, a timed metadata track may include, for each movie fragment, an indication of a respective position of a most-interested region and a respective size of the most-interested region.

More specifically, in some examples, a timed metadata track may include, for each one of one or more movie fragments that form an image, an indication of a loop over a most-interested region, each iteration of the loop representing one of the most-interested regions and including the syntax elements representative of a position in a number of luma samples relative to the image and the size of the most-interested region in a number of luma samples relative to the image.

In some examples, a timed metadata track may include, for each one of one or more movie fragments, an indication of a first syntax element representative of a top of the most-interested region in a number of luma samples relative to the image, a second syntax element representative of a bottom of the most-interested region in a number of luma samples relative to the image, a left side of the most-interested region in a number of luma samples relative to the image, and a right-side of the most interested region in a number of luma samples relative to the image.

In some examples, a timed metadata track may include, for each movie fragment, elements or attributes that include, for each of the most-interested regions, a first syntax element representative of an upper-left corner of the most-interested region in a number of luma samples relative to the image and a second syntax element representative of a lower-right corner of the most-interested region in a number of luma samples relative to the image.

In some examples, a timed metadata track may include, for each movie fragment, elements or attributes that include, for each of the most-interested regions, a first syntax element representative of an upper-left corner of the most-interested region in a number of luma samples relative to the image, a second syntax element representative of a width of the most-interested region in a number of luma samples relative to the image, and a third syntax element representative of a height of the most-interested region in a number of luma samples relative to the image.

In another example, SBGP box 162 may include data representative of the most-interested regions. For example, SBGP box 162 may include, for each movie fragment, an indication of a respective position of a most-interested region and a respective size of the most-interested region.

More specifically, in some examples, SBGP box 162 may include, for each movie fragment that form an image, an indication of that a loop over a most-interested region, each iteration of the loop representing one of the most-interested regions and including the syntax elements representative of the position of the most-interested region in a number of luma samples relative to the image and the size of the most-interested region in a number of luma samples relative to the image.

In some examples, SBGP box 162 may include, for each movie fragment that form an image, an indication of a first syntax element representative of a top of the most-interested region in a number of luma samples relative to the image, a second syntax element representative of a bottom of the most-interested region in a number of luma samples relative to the image, a left side of the most-interested region in a number of luma samples relative to the image, and a right-side of the most interested region in a number of luma samples relative to the image.

In some examples, SBGP box 162 may include, for each movie fragment that form an image, elements or attributes that include, for each of the most-interested regions, a first syntax element representative of an upper-left corner of the most-interested region in a number of luma samples relative to the image and a second syntax element representative of a lower-right corner of the most-interested region in a number of luma samples relative to the image.

In some examples, SBGP box 162 may include, for each movie fragment that form an image, elements or attributes that include, for each of the most-interested regions, a first syntax element representative of an upper-left corner of the most-interested region in a number of luma samples relative to the image, a second syntax element representative of a width of the most-interested region in a number of luma samples relative to the image, and a third syntax element representative of a height of the most-interested region in a number of luma samples relative to the image.

In another example, SEI message 172 may include data representative of the most-interested regions. For example, SEI message 172 may include, for each movie fragment that forms an image, an indication of a respective position of a most-interested region and a respective size of the most-interested region.

More specifically, for example, SEI message 172 may include, for each movie fragment that form an image, an indication of that a loop over a most-interested region, each iteration of the loop representing one of the most-interested regions and including the syntax elements representative of the position of the most-interested region in a number of luma samples relative to the image and the size of the most-interested region in a number of luma samples relative to the image.

In some examples, SEI message 172 may include, for each movie fragment that form an image, an indication of a first syntax element representative of a top of the most-interested region in a number of luma samples relative to the image, a second syntax element representative of a bottom of the most-interested region in a number of luma samples relative to the image, a left side of the most-interested region in a number of luma samples relative to the image, and a right-side of the most interested region in a number of luma samples relative to the image.

In some examples, SEI message 172 may include, for each movie fragment that form an image, elements or attributes that include, for each of the most-interested regions, a first syntax element representative of an upper-left corner of the most-interested region in a number of luma samples relative to the image and a second syntax element representative of a lower-right corner of the most-interested region in a number of luma samples relative to the image.

In some examples, SEI message 172 may include, for each movie fragment that form an image, elements or attributes that include, for each of the most-interested regions, a first syntax element representative of an upper-left corner of the most-interested region in a number of luma samples relative to the image, a second syntax element representative of a width of the most-interested region in a number of luma samples relative to the image, and a third syntax element representative of a height of the most-interested region in a number of luma samples relative to the image.

Figure 4:
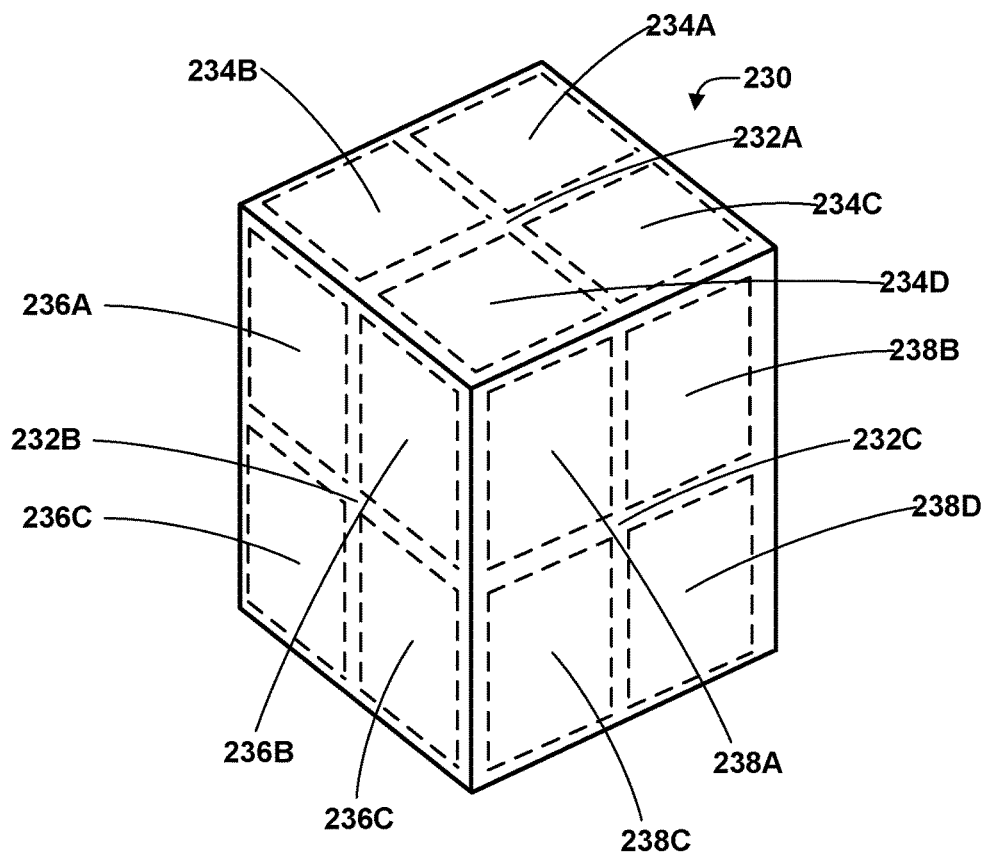
FIG. 4 is a conceptual diagram illustrating an example tile coding in a cuboidal projection.

FIG. 4 is a conceptual diagram illustrating an example tile coding in a cuboidal projection 230. Cuboidal projection 230 includes cube faces 232A, 232B, 232C, as shown, and includes additional cube faces, which are unshown because they are obstructed. In this example, each of the cube faces of cuboidal projection 230 is divided into four tiles: cube face 232A is divided into four tiles 234A-234D, cube face 232B is divided into four tiles 236A-236D, and cube face 232C is divided into four tiles 238A-238D. The other, unshown cube faces would also be divided into four respective tiles, in this example, for a total of 24 small tiles. In general, content preparation device 20 may provide video data for each of the tiles (e.g., tiles 234A-234D, 236A-236D, 238A-238D, and the tiles of the unshown cube faces).

In addition, content preparation device 20 may provide video data for large tiles, which may cover each of the cube faces. For example, content preparation device 20 may provide video data for a tile covering cube face 232A, video data for a tile covering cube face 232B, video data for a tile covering cube face 232C, and video data for tiles covering the unshown cube faces. In some examples, video encoder 28 may encode larger tile sizes only for those viewpoints which are more likely to be viewed. Thus, if it is unlikely that a user would look up or down, video encoder 28 may only code video data for large tiles covering cube faces 232B and 232C, and for opposing cube faces to cube faces 232B and 232C, but not, for example, cube face 232A. Optionally, each of the tiles may have left and right views for stereo video data.

VR is the ability to be virtually present in a non-physical world created by the rendering of natural and/or synthetic images and sound correlated by the movements of the immersed user, allowing the user to interact with that world. With the recent progress made in rendering devices, such as head mounted displays (HMDs), and VR video creation (often also referred to as 360 degree video), a significant quality of experience can be offered. VR applications include gaming, training, education, sports video, online shopping, adult entrainment, and so on.

A typical VR system may include the following components and techniques:
1) A camera set, which typically consists of multiple individual cameras pointing to different directions and ideally collectively covering all viewpoints around the camera set.
2) Image stitching, where video pictures taken by the multiple individual cameras are synchronized in the time domain and stitched in the space domain, to be a spherical video, but mapped to a rectangular format, such as equi-rectangular (like a world map) or cube map.
3) The video in the mapped rectangular format is encoded/compressed using a video codec, e.g., H.265/HEVC or H.264/AVC.
4) The compressed video bitstream(s) may be stored and/or encapsulated in a media format and transmitted (possibly only the subset covering only the area being seen by a user) through a network to a receiver.
5) The receiver receives the video bitstream(s) or part thereof, possibly encapsulated in a format, and sends the decoded video signal or part thereof to a rendering device.
6) The rendering device can be e.g., an HMD, which can track head movement and even eye move moment and rendering the corresponding part of the video such that an immersive experience is delivered to the user.

A feature of VR video compared to normal video is that in VR typically only a subset of the entire video region represented by the video pictures, corresponding to the current FOV, also referred to as viewport, e.g., the area currently being seen by the user, is displayed, while in normal video applications typically the entire video region is displayed. This feature may be utilized to improve the performance of VR video systems, e.g., by using viewport dependent projection mapping or viewport dependent video coding. The performance improvement can be either or both of lower transmission bandwidth and lower decoding complexity compared to conventional VR video systems under the same resolution/quality of the video part presented to the user.

Viewport dependent projection mapping may also be referred to as asymmetric projection mapping. One example is sub-sampled cube-map, for example, cuboidal projection 230. A typical cub-map may include of six equal-sized faces. In one example of a sub-sampled cub-map, one of the faces can be kept unchanged, while the face on the opposite side can be sub-sampled or down-scaled to a smaller size located at the center area of the original face shape, and other faces are geometrically scaled accordingly (still keeping the six faces). The extreme may be to down-scale the face on the opposite side to be a single point, and thus the cube becomes a pyramid. In another example of sub-sampled cub-map, some faces are proportionally down-sized e.g., by a 2×2 ratio (i.e., 2:1 in each direction parallel to an edge of the face).

Such down-sized scaling can also be applied to different regions for other projection mappings such as equi-rectangular. One example is to down-size both the upper and bottom regions (i.e., the poles).

Viewport dependent video coding may also be referred to as viewport based partial video decoding, to enable decoding only partially the entire encoded video region to provide sufficient information for display of the current FOV or viewport.

In one example of viewport dependent video coding, the VR video is coded using motion-constrained sets of tiles such that each potential region covering a FOV or viewport can be independently decoded from other regions. For a particular current FOV or viewport, the coded video data of the minimum set of independently decodable tiles that cover the current FOV or viewport is sent to the client, decoded, and displayed. A shortcoming of this approach is that when the user turns his or her head quickly to a new FOV that is not covered by the sent video data, nothing in the area not covered by the tiles of the video data can be seen before the data covering the new FOV arrives. This can easily happen unless the round trip time of the network is extremely low, e.g., at a magnitude of 10 milliseconds, which is not feasible or at least a big challenge today or in near future.

Another example of viewport dependent video coding was proposed in U.S. patent application Ser. No. 15/195, 439, filed Jun. 28, 2016, the entire content of which is incorporated by reference herein, named independent multi-resolution coding (IMRC), wherein the spherical/panorama video is encoded at multiple different resolutions independent of each other, and each representation is coded using motion-constrained sets of tiles. The receiver chooses to decode different portions of the spherical/panorama video at different resolutions. Typically, the portion of the spherical video that is being currently observed by the user, i.e., the current FOV or the current viewport, is part of the video bitstream coded at the highest resolution. The region surrounding the current FOV is part of the video bitstream coded using a slightly lower resolution, and so on. The portion of the panorama directly behind the observer's head is part of the video bitstream coded at the lowest resolution. It is claimed that, in case of a head movement by the user, the user experience will degrade only by a small amount in most cases, and the quality degradation being most severe only in case of very large sudden head movement, which is rare.

In yet another example of viewport dependent video coding, video bitstreams of multiple-resolutions are scalable-coded using a scalable video codec such as SHVC. In addition, the entire bitstream of the lowest resolution video (or the base layer) is always sent. The lowest resolution video does not need to be coded using tiles or motion-constrained sets of tiles, though it would also work if it is coded using tiles or motion-constrained sets of tiles. For other aspects, the same strategy as described above is applied. This approach allows more efficient coding of the lowest resolution video because coding of tiles or tile motion-constrained sets of tiles reduces coding efficiency, and also more efficient coding of streams of higher resolutions due the use of inter-layer prediction. Furthermore, this approach also allows for more efficient FOV switching, because once FOV switching starts, the server or edge server can immediately stop sending video data that is from the video stream of a higher resolution (than the base layer) and that is not covering any region of the new FOV. If the video data of the lowest resolution covering the current FOV is not sent (i.e., only the video data of the highest resolution covering the current FOV is sent), during FOV switching, the server sometimes would have to continue sending video data that is from the video stream of a highest resolution and that is covering only the old FOV or part thereof, to be prepared such that the user can at least see the lowest-quality video in case he/she turns back to the old FOV or part thereof In MPEG contribution m37819, a use case was discussed on signaling and using of information on director's cut, such that the VR playback may display the dynamically changing viewport that a director wants the audience to focus on even when the user is not turning his/her head or change the viewport through other UI. It was mentioned that such viewports may be provided with an omnidirectional video scene by scene.

Rather than necessarily relying only on a field of view of a user to select a quality to request tiles (e.g., tiles 234A-234D, 236A-236D, 238A-238D, and the tiles of the unshown cube faces), one or more techniques described herein permit client device 40 and/or server device 60 to pre-fetch high-quality data for one or more tiles that include one or more most-interested regions. For example, client device 40 may request tiles 234A-234D before receiving a FOV of the user when data representative of the one or more most-interested regions indicates that tiles 234A-234D include the one or more most-interested regions. In an example where the FOV includes regions of the image that are not included in the one or more most-interested regions, upon receiving the FOV of the user, client device 40 may request further tiles (e.g., 236A-236D, 238A-238D) to satisfy a current FOV of the user at a lower quality. In this manner, the one or more most-interested regions may be pre-fetched (e.g., fetched prior to receiving the FOV of the user) to permit the one or more most-interested regions to be received at the high-quality, thereby improving a playback of a video, such as, a virtual reality video.

Figure 5:
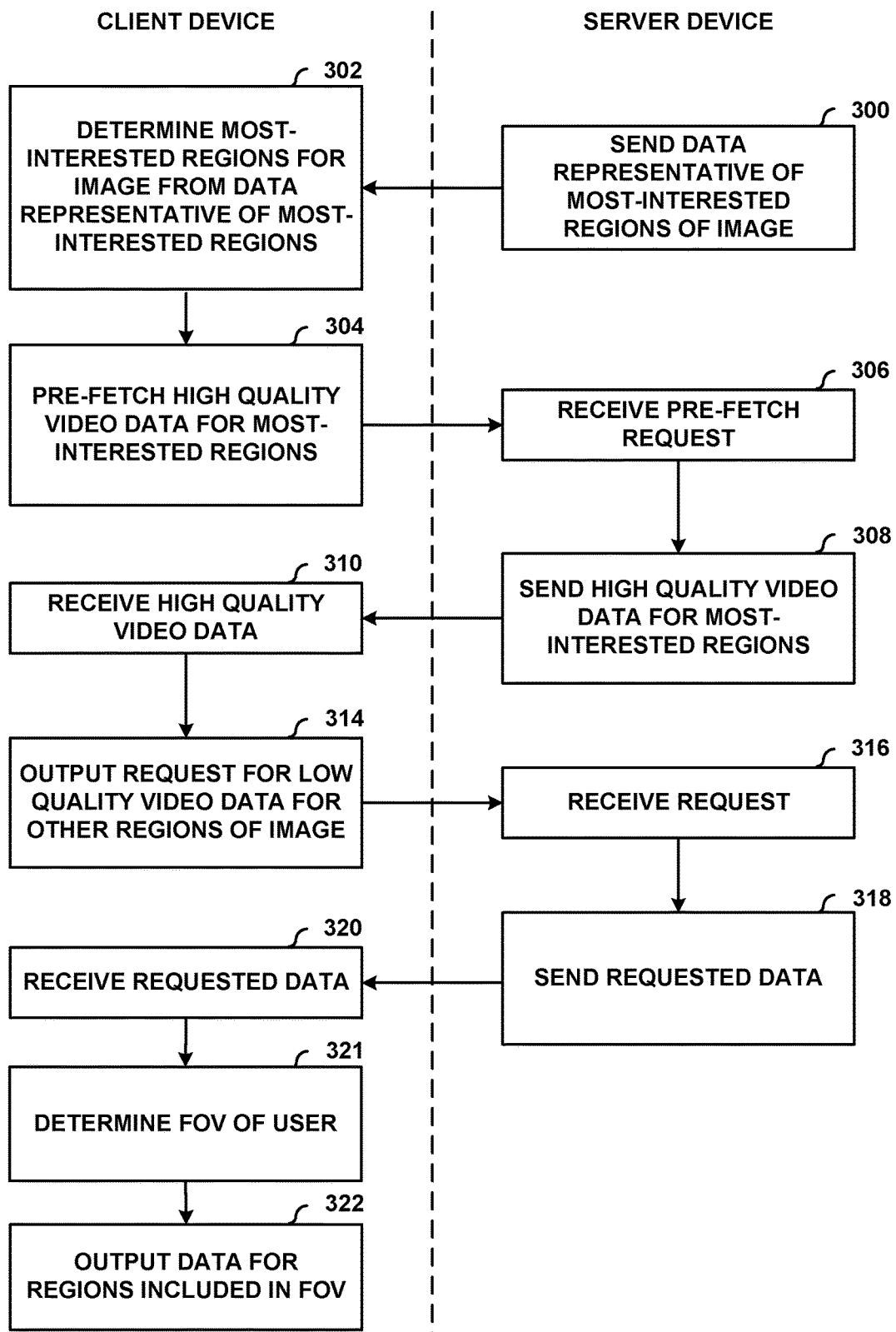
FIG. 5 is a flowchart illustrating an example approach for determining information for video data in accordance with one or more techniques described in this disclosure.

FIG. 5 is a flowchart illustrating an example approach for determining information for video data in accordance with one or more techniques described in this disclosure. The methods of FIG. 5 are described with respect to client device 40 and server device 60 of FIG. 1. However, it should be understood that other devices may be configured to perform these techniques.

Initially, server device 60 may send data representative of the most-interested regions of an image (300). The data representative of the most-interested regions may be external to VCL data of a bitstream including the video data. For example, server device 60 sends a supplemental enhancement information (SEI) message including the data representative of the most-interested regions. In some examples, server device 60 sends a sample group box (e.g., SBGP box 162 of FIG. 3) including the data representative of the most-interested regions. In some examples, server device 60 sends a timed metadata track including the data representative of the most-interested regions.

In any case, client device 40 may determine the most-interested regions of the image based on the data representative of the most-interested regions (302). For example, client device 40 may determine, for each one of the one or more most-interested regions, values for syntax elements representative of a position of the respective most-interested region and a size of the respective most-interested region using the data representative of the most-interested regions.

Client device 40 may pre-fetch high-quality video data for the one or more most-interested regions (304). For example, client device 40 may request video data for the one or more most-interested regions using a relatively high bitrate compared to other regions of the image. Server device 60 may receive the pre-fetch request (306) and may send high-quality video data for the one or more most-interested regions (308). Client device 40 may receive the high-quality video data (310). For example, client device 40 may fetch the video data for the one or more most-interested regions at a lower latency and/or at a higher quality than video data for the other regions of the image.

Client device 40 may output a request for low-quality video data for one or more other regions of the image (314). For example, client device 40 may request relatively low-quality video data for images 234C-D of FIG. 4 compared to video quality for the one or more most-interested regions when the one or more most-interested regions include images 238A-D of FIG. 4 and when the FOV of the user includes images 238A-D and 234C-D of FIG. 4. It should be understood that regions outside of a FOV (e.g., images 234A-B of FIG. 4) may not be requested or may be requested at relatively lower quality than the images determined using the FOV (e.g., images 238A-D and 234C-D of FIG. 4).

Server device 60 may receive the request (316) and may send the requested data for the one or more other regions of the image (318). Client device 40 may receive the requested data (320). Client device 40 may determine a FOV of a user (321) and output data for regions included in FOV to user (322). For example, client device 40 may determine that the FOV of the user includes images 238A-D and 234C-D of FIG. 4 and output images 238A-D and 234C-D of FIG. 4 for display using the high and low-quality video data (322).

In this manner, the method of FIG. 5 represents an example of a method including determining, by a processor of a client device, the processor implemented in circuitry, one or more most-interested regions of a plurality of regions of an image of video data based on data representative of the one or more most-interested regions, the data representative of the one or more most-interested regions being external to video coding layer (VCL) data of a bitstream including the video data; outputting, by the processor of the client device, a request for relatively high-quality video data for the one or more most-interested regions of the image; and outputting, by the processor of the client device, after outputting the request for the relatively high-quality video data, a request for relatively low-quality video data for one or more other regions of the image.

Likewise, the method of FIG. 5 also represents an example of a method including determining, by a processor of a source device, the processor implemented in circuitry, one or more most-interested regions of a plurality of regions of an image of video data, the one or more most-interested regions comprising one or more regions that are most likely to be retrieved by a client device; and generating, by the processor of the source device, data representative of the one or more most-interested regions, wherein the data representative of the one or more most-interested regions is external to video coding layer (VCL) data of a bitstream including the video data.

Figure 6:
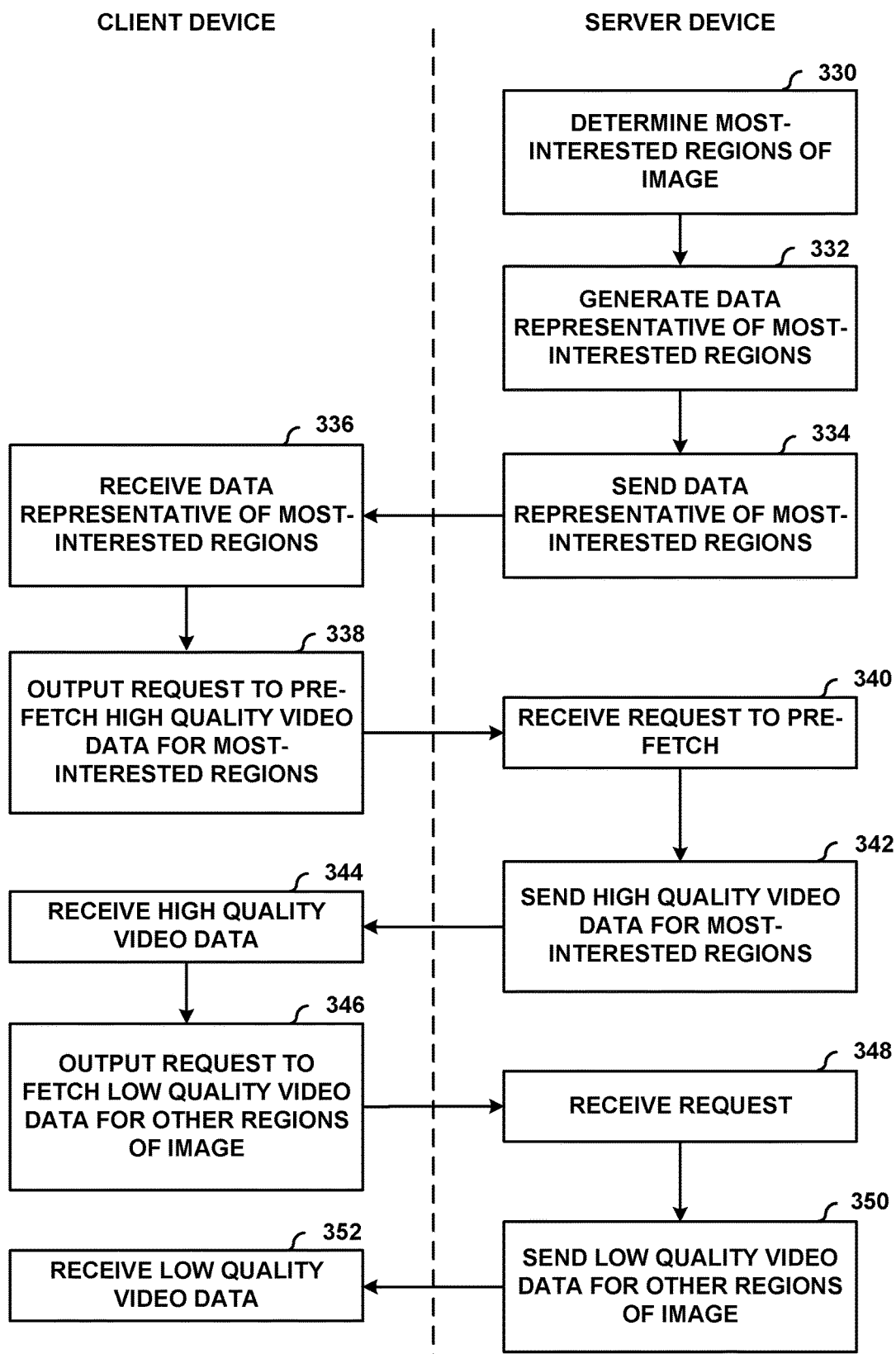
FIG. 6 is a flowchart illustrating an example approach for signaling information for video data in accordance with one or more techniques described in this disclosure.

FIG. 6 is a flowchart illustrating an example approach for signaling information for video data in accordance with one or more techniques described in this disclosure. The methods of FIG. 6 are described with respect to client device 40 and server device 60 of FIG. 1. However, it should be understood that other devices may be configured to perform these techniques.

Initially, server device 60 may determine one or more most-interested regions of an image (330). For example, server device 60 may receive an indication of a selection by a director or producer of the one or more most-interested regions or server device 60 (or another device) may derive the one or more most-interested regions from user statistics. In any case, server device 60 may generate data representative of the most-interested regions (332). The data representative of the most-interested regions may be external to VCL data of a bitstream including the video data. For example, server device 60 may generate a supplemental enhancement information (SEI) message including the data representative of the most-interested regions. In some examples, server device 60 may generate file-format data, such as a sample group box (e.g., SBGP box 162 of FIG. 3), including the data representative of the most-interested regions. In some examples, server device 60 may generate a timed metadata track including the data representative of the most-interested regions.

In any case, server device 60 may send the data representative of the most-interested regions (334) and client device 40 may receive the data representative of the most-interested regions (336). In response to receiving the data representative of the most-interested regions, client device 40 may output a request to pre-fetch high-quality video data for the one or more most-interested regions (338). Server device 60 may receive the request to pre-fetch high-quality video data for the one or more most-interested regions (340) and send high-quality video data for the one or more most-interested regions (342). Client device 40 may receive the high-quality video data (344).

Client device 40 may output a request for low-quality video data for one or more other regions of the image (346). Server device 60 may receive the request for low-quality video data for one or more other regions of the image (348). In response to receiving the request for low-quality video data for one or more other regions of the image, server device 60 may send low-quality video data for one or more other regions of the image (350). Client device 40 may receive the low-quality video data (352). Although not shown in the example of FIG. 6, client device 40 may then proceed to present at least part of the received video data to a user, e.g., as discussed above with respect to FIG. 5, e.g., based on a field of view of the user.

In this manner, the method of FIG. 6 represents an example of a method including determining, by a processor of a client device, the processor implemented in circuitry, one or more most-interested regions of a plurality of regions of an image of video data based on data representative of the one or more most-interested regions, the data representative of the one or more most-interested regions being external to video coding layer (VCL) data of a bitstream including the video data; outputting, by the processor of the client device, a request for relatively high-quality video data for the one or more most-interested regions of the image; and outputting, by the processor of the client device, after outputting the request for the relatively high-quality video data, a request for relatively low-quality video data for one or more other regions of the image.

Likewise, the method of FIG. 6 also represents an example of a method including determining, by a processor of a source device, the processor implemented in circuitry, one or more most-interested regions of a plurality of regions of an image of video data, the one or more most-interested regions comprising one or more regions that are most likely to be retrieved by a client device; and generating, by the processor of the source device, data representative of the one or more most-interested regions, wherein the data representative of the one or more most-interested regions is external to video coding layer (VCL) data of a bitstream including the video data.

Figure 7:
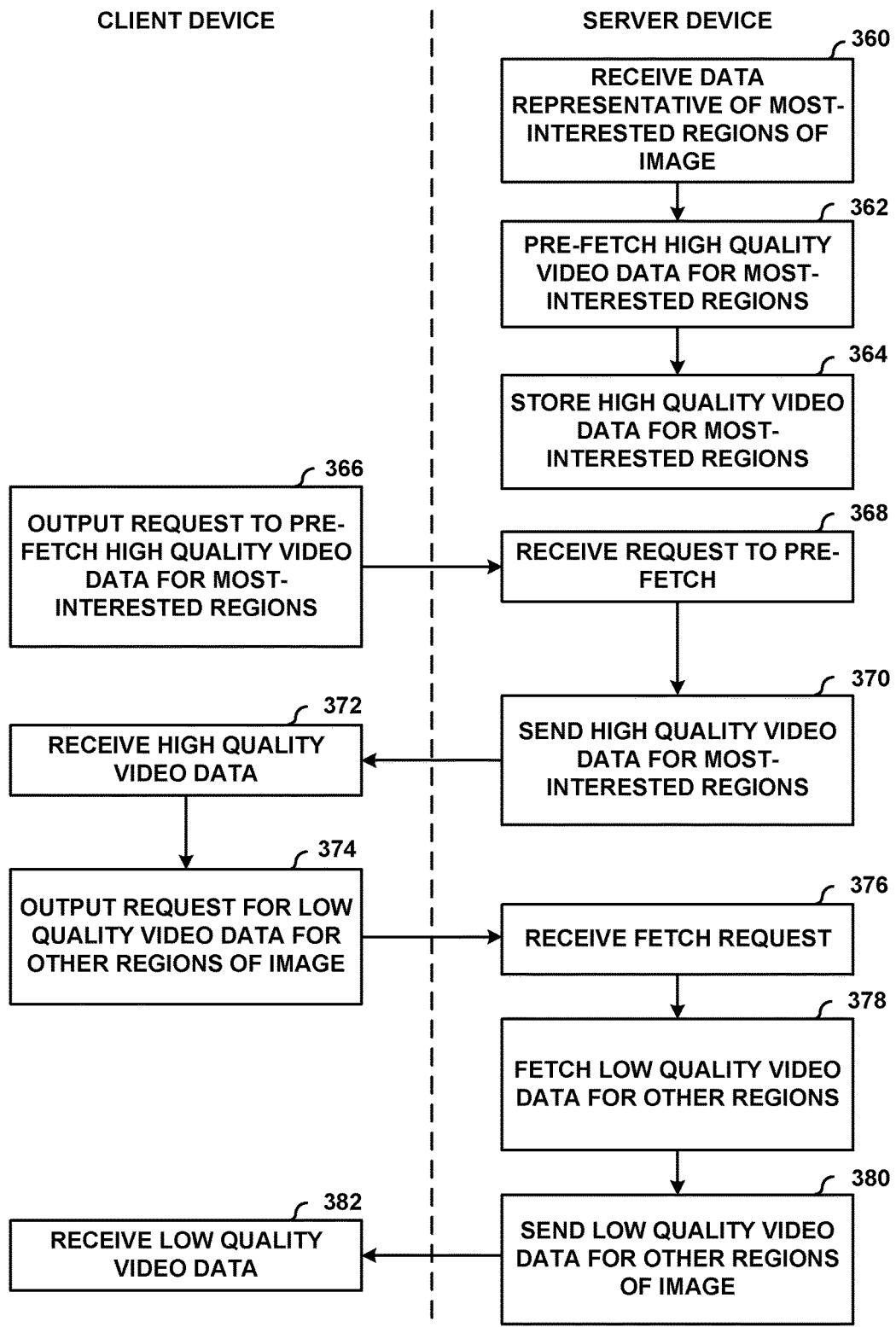
FIG. 7 is a flowchart illustrating an example approach for pre-fetching video data in accordance with one or more techniques described in this disclosure.

FIG. 7 is a flowchart illustrating an example approach for pre-fetching video data in accordance with one or more techniques described in this disclosure. The methods of FIG. 7 are described with respect to client device 40 and server device 60 of FIG. 1. However, it should be understood that other devices may be configured to perform these techniques. In the example of FIG. 7, server device 60 may be configured as a CDN server that initially retrieves data from an origin server, and temporarily stores the data. It should be understood that the example of FIG. 7 demonstrates that either or both of client device 40 and server device 60 may use the data representative of the most-interested regions.

Initially, server device 60 may receive data representative of the most-interested regions of an image (360). The data representative of the most-interested regions may be external to VCL data of a bitstream including the video data. For example, server device 60 receives a supplemental enhancement information (SEI) message including the data representative of the most-interested regions. In some examples, server device 60 receives a sample group box (e.g., SBGP box 162 of FIG. 3) including the data representative of the most-interested regions. In some examples, server device 60 receives a timed metadata track including the data representative of the most-interested regions. In any case, server device 60 may pre-fetch high-quality video data for the one or more interested regions (362). For example, server device 60 may use the one or more most-interested regions to pre-fetch video data for the one or more most-interested regions. For instance, server device 60 may fetch the video data for the one or more most-interested regions at a lower latency and/or at a higher quality than video data for the other regions of the image.

Upon pre-fetching high-quality video data for the one or more interested regions, server device 60 may store the pre-fetched, high-quality video data for the one or more most-interested regions (364). In an example where server device 60 is an edge server configured to store (e.g., cache) video data, server device 60 may store the high-quality video data. In some examples, server device 60 may determine a duration of storage for the high-quality video data for the one or more most-interested regions based on the data representative of the most-interested regions of an image. For instance, server device 60 may rank the high-quality video data higher when server device 60 determines that the high-quality video data higher is for the most-interested regions, such that the high-quality video data for the most-interested regions is kept for long-term storage while other video data (e.g., for other regions), which was retrieved at a similar time as the high-quality video data for the most-interested regions, is removed.

Client device 40 may output a request to pre-fetch high-quality video data for the one or more most-interested regions (366). For example, client device 40 may request video data for the one or more most-interested regions using a relatively high bitrate compared to other regions of the image. Server device 60 may receive the pre-fetch request (368) and may send high-quality video data for the one or more most-interested regions (370). Client device 40 may receive the high-quality video data (372).

Client device 40 may output a request for low-quality video data for one or more other regions of the image (374). Server device 60 may receive the request for low-quality video data for one or more other regions of the image (376). In response to receiving the request for low-quality video data for one or more other regions of the image, server device 60 may fetch low-quality video data for one or more other regions of the image (378) and send low-quality video data for one or more other regions of the image (380). Client device 40 may receive the low-quality video data (382). Although not shown in the example of FIG. 7, client device 40 may then proceed to present at least part of the received video data to a user, e.g., as discussed above with respect to FIG. 5, e.g., based on a field of view of the user.

In this manner, the method of FIG. 7 represents an example of a method including determining, by a processor of a client device, the processor implemented in circuitry, one or more most-interested regions of a plurality of regions of an image of video data based on data representative of the one or more most-interested regions, the data representative of the one or more most-interested regions being external to video coding layer (VCL) data of a bitstream including the video data; outputting, by the processor of the client device, a request for relatively high-quality video data for the one or more most-interested regions of the image; and outputting, by the processor of the client device, after outputting the request for the relatively high-quality video data, a request for relatively low-quality video data for one or more other regions of the image.

Likewise, the method of FIG. 7 also represents an example of a method including determining, by a processor of a source device, the processor implemented in circuitry, one or more most-interested regions of a plurality of regions of an image of video data, the one or more most-interested regions comprising one or more regions that are most likely to be retrieved by a client device; and generating, by the processor of the source device, data representative of the one or more most-interested regions, wherein the data representative of the one or more most-interested regions is external to video coding layer (VCL) data of a bitstream including the video data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of determining information for video data, the method comprising:
   determining, by a processor of a client device, the processor implemented in circuitry, one or more most-interested regions of a plurality of regions of an image of video data based on data representative of the one or more most-interested regions, the data representative of the one or more most-interested regions being external to video coding layer (VCL) data of a bitstream including the video data;
outputting, by the processor of the client device, a request for relatively high-quality video data for the one or more most-interested regions of the image;
receiving, by the processor of the client device, the relatively high-quality video data for the one or more most-interested regions of the image;
outputting, by the processor of the client device, after outputting the request for the relatively high-quality video data, a request for relatively low-quality video data for one or more other regions of the image, the request for the relatively low-quality video data including an indication of the one or more other regions of the image, wherein the relatively high-quality video data comprises higher quality video data than the relatively low-quality video data; and
receiving, by the processor of the client device, the relatively low-quality video data for the one or more other regions of the image.

2. The method of claim 1, further comprising:
outputting, by the processor of the client device, after outputting the request for the relatively high-quality video data for the one or more most-interested regions of the image, a request for relatively high-quality video data for one or more regions of a subsequent image based on a field of view (FOV).

3. The method of claim 1, wherein determining the one or more most-interested regions comprises determining the one or more most-interested regions based on a supplemental enhancement information (SEI) message that includes the data representative of the one or more most-interested regions.

4. The method of claim 1, wherein determining the one or more most-interested regions comprises determining the one or more most-interested regions based on a sample group box that includes the data representative of the one or more most-interested regions, the sample group box being included in file format header information of a file that includes the VCL data.

5. The method of claim 1, wherein determining the one or more most-interested regions of the plurality of regions of the image comprises determining the one or more most-interested regions of the plurality of regions of the image based on a timed metadata track that includes the data representative of the one or more most-interested regions.

6. The method of claim 1, wherein determining the one or more most-interested regions comprises determining the one or more most-interested regions based on a dynamic adaptive streaming over HTTP (DASH) media presentation description (MPD) including the data representative of the one or more most-interested regions.

7. The method of claim 1, wherein determining the one or more most-interested regions comprises determining the one or more most-interested regions based on at least one syntax element of the data representative of the one or more most-interested regions, the syntax element having a value representative of a number of the one or more most-interested regions.

8. The method of claim 1, wherein determining the one or more most-interested regions comprises determining, for each most-interested region of the one or more most-interested regions, a plurality of values for a plurality of syntax elements representative of a position of a respective most-interested region and a size of the respective most-interested region.

9. The method of claim 8, wherein determining, for each most-interested region of the one or more most-interested regions, the plurality of values for the plurality of syntax elements representative of the position of the respective most-interested region and the size of the respective most-interested region comprises determining, for each most-interested region of the one or more most-interested regions, a loop over the respective most-interested region that represents the position of the respective most-interested region and the size of the respective most-interested region.

10. The method of claim 8, wherein determining, for each most-interested region of the one or more most-interested regions, the plurality of values for the plurality of syntax elements representative of the position of the respective most-interested region and the size of the respective most-interested region comprises determining, for each most-interested region of the one or more most-interested regions, a first syntax element representative of a top of the respective most-interested region, a second syntax element representative of a bottom of the respective most-interested region, a third syntax element representative of a left side of the respective most-interested region, and a fourth syntax element representative of a right-side of the respective most interested region.

11. The method of claim 8, wherein determining, for each most-interested region of the one or more most-interested regions, the plurality of values for the plurality of syntax elements representative of the position of the respective most-interested region and the size of the respective most-interested region comprises determining, for each most-interested region of the one or more most-interested regions, a first syntax element representative of an upper-left corner of the respective most-interested region and a second syntax element representative of a lower-right corner of the respective most-interested region.

12. The method of claim 8, wherein determining, for each most-interested region of the one or more most-interested regions, the plurality of values for the plurality of syntax elements representative of the position of the respective most-interested region and the size of the respective most-interested region comprises determining, for each most-interested region of the one or more most-interested regions, a first syntax element representative of an upper-left corner of the respective most-interested region, a second syntax element representative of a width of the respective most-interested region, and a third syntax element representative of a height of the respective most-interested region.

13. A device for determining information for video data, the device comprising one or more processors implemented in circuitry that are configured to:
determine one or more most-interested regions of a plurality of regions of an image of video data based on data representative of the one or more most-interested regions, the data representative of the one or more most-interested regions being external to video coding layer (VCL) data of a bitstream including the video data;
output a request for relatively high-quality video data for the one or more most-interested regions of the image;
receive the relatively high-quality video data for the one or more most-interested regions of the image;
output, after outputting the request for the relatively high-quality video data, a request for relatively low-quality video data for one or more other regions of the image, the request for the relatively low-quality video data including an indication of the one or more other regions of the image, wherein the relatively high-quality video data comprises higher quality video data than the relatively low-quality video data; and receive the relatively low-quality video data for the one or more other regions of the image that form a second portion of the image.

14. The device of claim 13, wherein, to determine the one or more most-interested regions, the one or more processors are further configured to:

determine the one or more most-interested regions based on a sample group box that includes the data representative of the one or more most-interested regions, the sample group box being included in file format header information of a file that includes the VCL data.

15. The device of claim 13, wherein, to determine the one or more most-interested regions, the one or more processors are further configured to:

determine the one or more most-interested regions based on a timed metadata track that includes the data representative of the one or more most-interested regions.

16. The device of claim 13, wherein, to determine the one or more most-interested regions, the one or more processors are further configured to:

determine the one or more most-interested regions based on at least one syntax element of the data representative of the one or more most-interested regions, the syntax element having a value representative of a number of the one or more most-interested regions.

17. The device of claim 13, wherein, to determine the one or more most-interested regions, the one or more processors are further configured to:

determine the one or more most-interested regions, for each most-interested region of the one or more most-interested regions, a plurality of values for a plurality of syntax elements representative of a position of a respective most-interested region and a size of the respective most-interested region.

18. The device of claim 17, wherein, to determine, for each most-interested region of the one or more most-interested regions, the plurality of values for the plurality of syntax elements representative of the position of the respective most-interested region and the size of the respective most-interested region, the one or more processors are further configured to:

determine, for each most-interested region of the one or more most-interested regions, a loop over the respective most-interested region that represents the position of the respective most-interested region and the size of the respective most-interested region.

19. The device of claim 17, wherein, to determine, for each most-interested region of the one or more most-interested regions, the plurality of values for the plurality of syntax elements representative of the position of the respective most-interested region and the size of the respective most-interested region, the one or more processors are further configured to:

determine, for each most-interested region of the one or more most-interested regions, a first syntax element representative of a top of the respective most-interested region, a second syntax element representative of a bottom of the respective most-interested region, a third syntax element representative of a left side of the respective most-interested region, and a fourth syntax element representative of a right-side of the respective most interested region.

20. The device of claim 17, wherein, to determine, for each most-interested region of the one or more most-interested regions, the plurality of values for the plurality of syntax elements representative of the position of the respective most-interested region and the size of the respective most-interested region, the one or more processors are further configured to:

determine, for each most-interested region of the one or more most-interested regions, a first syntax element representative of an upper-left corner of the respective most-interested region, a second syntax element representative of a width of the respective most-interested region, and a third syntax element representative of a height of the respective most-interested region.

21. A non-transitory computer-readable storage medium having stored thereon instructions that, when executed, cause a processor to:

determine one or more most-interested regions of a plurality of regions of an image of video data based on data representative of the one or more most-interested regions, the data representative of the one or more most-interested regions being external to video coding layer (VCL) data of a bitstream including the video data;

output a request for relatively high-quality video data for the one or more most-interested regions of the image;

receive the relatively high-quality video data for the one or more most-interested regions of the image;

output, after outputting the request for the relatively high-quality video data, a request for relatively low-quality video data for one or more other regions of the image, the request for the relatively low-quality video data including an indication of the one or more other regions of the image, wherein the relatively high-quality video data comprises higher quality video data than the relatively low-quality video data; and receive the relatively low-quality video data for the one or more other regions of the image that form a second portion of the image.

22. A method of signaling information for video data, the method comprising:

determining, by a processor of a source device, the processor implemented in circuitry, one or more most-interested regions of a plurality of regions of an image of video data, the one or more most-interested regions comprising one or more regions that are most likely to be retrieved by a client device;

generating, by the processor of the source device, data representative of the one or more most-interested regions, wherein the data representative of the one or more most-interested regions is external to video coding layer (VCL) data of a bitstream including the video data;

outputting, by the processor of the source device, in response to a request for relatively high-quality video data for the one or more most-interested regions of the image, the relatively high-quality video data for the one or more most-interested regions of the image; and outputting, by the processor of the source device, in response to a request for relatively low-quality video data for one or more other regions of the image that is received after the request for the relatively high-quality video data, the relatively low-quality video data for the one or more other regions of the image, the request for the relatively low-quality video data including an indication of the one or more other regions of the image, wherein the relatively high-quality video data comprises higher quality video data than the relatively low-quality video data.

23. The method of claim 22, wherein generating the data representative of the one or more most-interested regions comprises generating a supplemental enhancement information (SEI) message that includes the data representative of the one or more most-interested regions.

24. The method of claim 22, wherein generating the data representative of the one or more most-interested regions comprises generating a sample group box that includes the data representative of the one or more most-interested regions, the sample group box being included in file format header information of a file that includes the VCL data.

25. The method of claim 22, generating the data representative of the one or more most-interested regions comprises generating a timed metadata track that includes the data representative of the one or more most-interested regions.

26. The method of claim 22, wherein generating the data representative of the one or more most-interested regions comprises generating a dynamic adaptive streaming over HTTP (DASH) media presentation description (MPD) including the data representative of the one or more most-interested regions.

27. The method of claim 22, wherein generating the data representative of the one or more most-interested regions comprises generating at least one syntax element of the data representative of the one or more most-interested regions, the syntax element having a value representative of a number of the one or more most-interested regions.

28. The method of claim 22, wherein generating the data representative of the one or more most-interested regions comprises generating, for each most-interested region of the one or more most-interested regions, a plurality of values for a plurality of syntax elements representative of a position of a respective most-interested region and a size of the respective most-interested region.

29. The method of claim 28, wherein generating, for each most-interested region of the one or more most-interested regions, the plurality of values for the plurality of syntax elements representative of the position of the respective most-interested region and the size of the respective most-interested region comprises generating, for each most-interested region of the one or more most-interested regions, a loop over the respective most-interested region that represents the position of the respective most-interested region and the size of the respective most-interested region.

30. The method of claim 28, wherein generating, for each most-interested region of the one or more most-interested regions, the plurality of values for the plurality of syntax elements representative of the position of the respective most-interested region and the size of the respective most-interested region comprises generating, for each most-interested region of the one or more most-interested regions, a first syntax element representative of a top of the respective most-interested region, a second syntax element representative of a bottom of the respective most-interested region, a third syntax element representative of a left side of the respective most-interested region, and a fourth syntax element representative of a right-side of the respective most interested region.

31. The method of claim 28, wherein generating, for each most-interested region of the one or more most-interested regions, the plurality of values for the plurality of syntax elements representative of the position of the respective most-interested region and the size of the respective most-interested region comprises generating, for each most-interested region of the one or more most-interested regions, a first syntax element representative of an upper-left corner of the respective most-interested region and a second syntax element representative of a lower-right corner of the respective most-interested region.

32. The method of claim 28, wherein generating, for each most-interested region of the one or more most-interested regions, the plurality of values for the plurality of syntax elements representative of the position of the respective most-interested region and the size of the respective most-interested region comprises generating, for each most-interested region of the one or more most-interested regions, a first syntax element representative of an upper-left corner of the respective most-interested region, a second syntax element representative of a width of the respective most-interested region, and a third syntax element representative of a height of the respective most-interested region.

33. The method of claim 22, wherein determining the one or more most-interested regions comprises determining the most-interested regions using one or more of an intent of a director or user statistics.

34. A device for signaling information for video data, the device comprising one or more processors implemented in circuitry that are configured to:
   determine one or more most-interested regions of a plurality of regions of an image of video data, the one or more most-interested regions comprising one or more regions that are most likely to be retrieved by a client device;
   generate data representative of the one or more most-interested regions, wherein the data representative of the one or more most-interested regions is external to video coding layer (VCL) data of a bitstream including the video data;
   output, in response to a request for relatively high-quality video data for the one or more most-interested regions of the image, the relatively high-quality video data for the one or more most-interested regions of the image; and
   output, in response to a request for relatively low-quality video data for one or more other regions of the image that is received after the request for the relatively high-quality video data, the relatively low-quality video data for the one or more other regions of the image, the request for the relatively low-quality video data including an indication of the one or more other regions of the image, wherein the relatively high-quality video data comprises higher quality video data than the relatively low-quality video data.

35. The device of claim 34, wherein, to generate data representative of the one or more most-interested regions, the one or more processors are further configured to:
   generate a sample group box that includes the data representative of the one or more most-interested regions, the sample group box being included in file format header information of a file that includes the VCL data.

36. The device of claim 34, wherein, to generate data representative of the one or more most-interested regions, the one or more processors are further configured to:
   generate a timed metadata track that includes the data representative of the one or more most-interested regions.

37. The device of claim 34, wherein, to generate data representative of the one or more most-interested regions, the one or more processors are further configured to:
   generate a value representative of a number of the one or more most-interested regions.

38. The device of claim 34, wherein, to generate data representative of the one or more most-interested regions, the one or more processors are further configured to:

generate, for each most-interested region of the one or more most-interested regions, a plurality of values for a plurality of syntax elements representative of a position of a respective most-interested region and a size of the respective most-interested region.

39. The device of claim 38, wherein, to generate, for each most-interested region of the one or more most-interested regions, the plurality of values for the plurality of syntax elements representative of the position of the respective most-interested region and the size of the respective most-interested region, the one or more processors are further configured to:

generate, for each most-interested region of the one or more most-interested regions, a loop over the respective most-interested region that represents the position of the respective most-interested region and the size of the respective most-interested region.

40. The device of claim 38, wherein, to generate, for each most-interested region of the one or more most-interested regions, the plurality of values for the plurality of syntax elements representative of the position of the respective most-interested region and the size of the respective most-interested region, the one or more processors are further configured to:

generate, for each most-interested region of the one or more most-interested regions, a first syntax element representative of a top of the respective most-interested region, a second syntax element representative of a bottom of the respective most-interested region, a third syntax element representative of a left side of the respective most-interested region, and a fourth syntax element representative of a right-side of the respective most interested region.

41. The device of claim 38, wherein, to generate, for each most-interested region of the one or more most-interested regions, the plurality of values for the plurality of syntax elements representative of the position of the respective most-interested region and the size of the respective most-interested region, the one or more processors are further configured to:

generate, for each most-interested region of the one or more most-interested regions, a first syntax element representative of an upper-left corner of the respective most-interested region, a second syntax element representative of a width of the respective most-interested region, and a third syntax element representative of a height of the respective most-interested region.

42. A non-transitory computer-readable storage medium having stored thereon instructions that, when executed, cause a processor to:

determine one or more most-interested regions of a plurality of regions of an image of video data, the one or more most-interested regions comprising one or more regions that are most likely to be retrieved by a client device;

generate data representative of the one or more most-interested regions, wherein the data representative of the one or more most-interested regions is external to video coding layer (VCL) data of a bitstream including the video data;

output, in response to a request for relatively high-quality video data for the one or more most-interested regions of the image, the relatively high-quality video data for the one or more most-interested regions of the image; and output, in response to a request for relatively low-quality video data for one or more other regions of the image that is received after the request for the relatively high-quality video data, the relatively low-quality video data for the one or more other regions of the image, the request for the relatively low-quality video data including an indication of the one or more other regions of the image, wherein the relatively high-quality video data comprises higher quality video data than the relatively low-quality video data.

* * * * *